(12) United States Patent
Zhong et al.

(10) Patent No.: US 10,816,241 B2
(45) Date of Patent: Oct. 27, 2020

(54) METHOD FOR EXTRACTING THERMAL ENERGY IN UNDERGROUND HIGH TEMPERATURE AREA OF COALFIELD FIRE AREA

(71) Applicants: China University of Mining and Technology, Xuzhou (CN); Changzhou University, Changzhou (CN)

(72) Inventors: Xiaoxing Zhong, Xuzhou (CN); Yan Tang, Xuzhou (CN); Fei Hou, Xuzhou (CN); He Zhu, Xuzhou (CN); Xinhao Zhang, Xuzhou (CN); Guangyu Li, Xuzhou (CN); Deming Wang, Xuzhou (CN)

(73) Assignees: CHINA UNIVERSITY OF MINING AND TECHNOLOGY, Xuzhou (CN); CHANGZHOU UNIVERSITY, Changzhou (CN)

( * ) Notice: Subject to any disclaimer, the term of this patent is extended or adjusted under 35 U.S.C. 154(b) by 70 days.

(21) Appl. No.: 16/091,997

(22) PCT Filed: May 4, 2017

(86) PCT No.: PCT/CN2017/082987
§ 371 (c)(1),
(2) Date: Oct. 8, 2018

(87) PCT Pub. No.: WO2018/126573
PCT Pub. Date: Jul. 12, 2018

(65) Prior Publication Data
US 2019/0346180 A1 Nov. 14, 2019

(30) Foreign Application Priority Data
Jan. 9, 2017 (CN) .......................... 2017 1 0012418

(51) Int. Cl.
*F24T 10/20* (2018.01)
*F24T 10/00* (2018.01)

(52) U.S. Cl.
CPC ........... *F24T 10/20* (2018.05); *F24T 2010/50* (2018.05); *F24T 2010/56* (2018.05)

(58) Field of Classification Search
CPC ......... E21B 43/243; F24T 10/10; F24T 10/20; F24T 2010/50; F24T 2010/56
See application file for complete search history.

(56) References Cited

U.S. PATENT DOCUMENTS 3,865,186 A * 2/1975 Von Hippel .......... E21B 43/243
166/256
4,018,279 A * 4/1977 Reynolds .............. E21B 43/243
166/258

(Continued)

FOREIGN PATENT DOCUMENTS

CN 102508309 A 6/2012
CN 103396154 A 11/2013

(Continued)

*Primary Examiner* — Jennifer H Gay
(74) *Attorney, Agent, or Firm* — Bayramoglu Law Offices LLC

(57) ABSTRACT

A method for extracting thermal energy in an underground high temperature area of a coalfield fire area, including: determining a thermal extraction target area by a natural potential method and a ground detecting borehole; using an injection borehole to send a gaseous thermal medium to an underground high temperature area of the thermal extraction target area; after the thermal exchange between the gaseous thermal medium and a high temperature coal rock mass, the gaseous thermal medium is extracted through an extraction borehole; continuously monitoring a natural potential of the thermal extraction target area; arranging a casing-type borehole thermal exchanger in a potential anomaly region to complete the thermal exchange between the high tempera- (Continued)

ture coal rocks and a liquid thermal medium; stopping the thermal extraction operations when the temperatures of the extracted gaseous thermal medium and the liquid thermal medium reach 70° C. or below.

6 Claims, 2 Drawing Sheets

(56) References Cited

U.S. PATENT DOCUMENTS

| | | | | |
|---|---|---|---|---|
| 4,092,052 | A * | 5/1978 | Terry | E21B 43/243 |
| | | | | 166/261 |
| 4,557,328 | A * | 12/1985 | Birch | E21B 43/243 |
| | | | | 122/235.26 |
| 8,915,084 | B2 * | 12/2014 | Rogers | F24T 10/15 |
| | | | | 60/641.2 |
| 10,047,594 | B2 * | 8/2018 | Vinegar | E21B 43/243 |
| 2010/0006281 | A1 | 1/2010 | DuBrucq | |
| 2019/0346180 | A1 * | 11/2019 | Zhong | F24T 50/00 |
| 2020/0036303 | A1 * | 1/2020 | Zhou | H01L 35/30 |

FOREIGN PATENT DOCUMENTS

| | | |
|---|---|---|
| CN | 105298569 A | 2/2016 |
| CN | 106026778 A | 10/2016 |
| CN | 106288465 A | 1/2017 |
| CN | 106679207 A | 5/2017 |
| SU | 1786248 A1 | 1/1993 |

\* cited by examiner

US 10,816,241 B2

METHOD FOR EXTRACTING THERMAL ENERGY IN UNDERGROUND HIGH TEMPERATURE AREA OF COALFIELD FIRE AREA

CROSS REFERENCE TO RELATED APPLICATIONS

This application is the national phase entry of International Application No. PCT/CN2017/082987, filed on May 4, 2017, which is based upon and claims priority to Chinese Patent Application No. 201710012418.8, filed on Jan. 9, 2017, the entire contents of which are incorporated herein by reference.

TECHNICAL FIELD

The present invention relates to a method for thermal energy extraction, and particularly to a method for extracting thermal energy in underground high temperature area of the coalfield fire area.

BACKGROUND

Coalfield fire refers to the phenomenon that, when underground coal seams are ignited by natural or human factors, the fire gradually develops along the coal seams into a large-area coal combustion, which causes great damage to the coal resources and the surrounding environment. The coalfield fire area has a large burning area and high temperature, and contains high thermal energy. Every year, about 1 billion tons of coal is burnt down by underground coal fire in the world, accounting for about 12.5% of the total coal consumption, generating about 1000 GW of energy, equivalent to 2.5 times the total energy produced by 500 nuclear power plants around the world.

In order to extract and make use of thermal energy in coalfield fire area, a patent document with a publication number of CN106026778A discloses sustainable utilization of thermal energy in coalfield fire area and coal fire control system and method. The method proposes to arrange horizontal steel pipes in the fire area of the coalfield and introduce a heat carrier to realize the purpose of extracting thermal energy, but there are the following practical problems: 1. radius of the pipeline for heat transfer is relatively small, and the thermal extraction efficiency is low; 2. when it is used for large-area thermal recovery in the coalfield fire area, a large number of steel pipes need to be buried, which is basically difficult to achieve because of the large amount of engineering and the difficulty of horizontal drilling; 3. it is difficult to recycle the pipeline, with high cost and low applicability.

In order to improve the control range of thermal extraction and thermal extraction efficiency and reduce the amount of engineering, the patent document with a publication number of CN105298569A discloses a method for extracting and converting thermal energy in coalfield fire area. The method proposes to use a gaseous thermal medium to achieve thermal recovery in a large-area coalfield fire area. This method has a large thermal exchange control range and is more suitable for use in a high temperature area having a porous medium property and better gas flowability. However, the geology of the underground high temperature area in the coalfield fire area is complex, and there are widespread geological regions with high coal rocks compactness and poor gas permeability. It is difficult for the injected gaseous thermal medium to enter these areas, resulting in the inability to achieve effective thermal exchange with high temperature coal rocks in the area, which seriously affects the thermal extraction amount and thermal extraction efficiency of the coalfield fire area. At present, there is no efficient extraction method for thermal energy in the high temperature area of the coalfield fire area with uneven gas permeability.

Therefore, those skilled in the art are working to develop a method for extracting thermal energy in the underground high temperature area of the coalfield fire area. On the basis of the effective exploration and identification of different gas-permeability areas in the underground high-temperature area of the coalfield fire area, the high-efficiency extraction of thermal energy in the underground high-temperature area of the coalfield fire area can be achieved by combining the thermal exchanges of the gaseous thermal medium and liquid thermal medium.

SUMMARY

Objective of the present invention: in order to overcome the deficiencies existing in the prior art, the present invention provides a method for extracting thermal energy in an underground high temperature area of a coalfield fire area, which can realize efficient extraction of thermal energy in the underground high temperature area of the coalfield fire area with uneven gas permeability.

Technical solution: in order to achieve the above objective, the technical solution adopted by the present invention is as follows.

A method for extracting thermal energy in an underground high temperature area of a coalfield fire area includes the following steps. A thermal extraction target area is determined by a natural potential method and a ground detecting borehole; and the injection borehole is used to send a low temperature gaseous thermal medium to the underground high temperature area of the thermal extraction target area; after the thermal exchange between the gaseous thermal medium and the high temperature coal rock mass in the fire area, the high temperature gaseous thermal medium is extracted from the earth surface through the extraction borehole; the natural potential of the thermal extraction target area is continuously monitored while the high temperature gaseous thermal medium is extracted; a casing-type borehole thermal exchanger is arranged in a potential anomaly region persistently existing in the thermal extraction target area to complete the thermal exchange between the high temperature coal rocks and the liquid thermal medium in this region; when the temperatures of the extracted gaseous thermal medium and liquid thermal medium reach 70° C. or below, the thermal extraction operation is stopped.

Preferably, the method specifically includes the following steps:

A. detecting the potential anomaly region in the coalfield fire area through the natural potential method, and combining the ground detecting borehole to determine the thermal extraction target area;

B. filling the surface cracks, collapse pits and other air inlet and outlet channels covering the thermal extraction target area by using a flame-retardant filling body;

C. performing the construction from the earth surface to the underground high temperature area in the thermal extraction target area to drill the extraction borehole and injection borehole of the gaseous thermal medium successively;

D. using a gas booster pump arranged on the earth surface to pressurize low temperature gaseous thermal medium and then introducing it into the injection borehole; and subsequently extracting the high temperature gaseous thermal medium which completes thermal exchange with the high temperature coal rock mass to the earth surface by using a vacuum pump through the extraction borehole;

E. using a thermometer to detect the temperature of the gaseous thermal medium at the exit of the extraction borehole, and stopping the thermal extraction operation of the gaseous thermal medium when the temperature of the gaseous thermal medium reaches 70° C. or below; continuously monitoring the natural potential of the thermal extraction target area while extracting the high temperature gaseous thermal medium; constructing boreholes from the earth surface to the underground high temperature area within the potential anomaly region persistently existing in the thermal extraction target area, and installing the casing-type borehole thermal exchanger;

F. injecting the liquid thermal medium into the casing-type borehole thermal exchanger by using a circulation pump; using the casing-type borehole thermal exchanger to complete the thermal exchange between the liquid thermal medium and the high temperature coal rocks; and extracting the liquid thermal medium after completing the thermal exchange with the high temperature coal rocks;

G. using a thermometer to detect the temperature of the liquid thermal medium at the exit of the borehole thermal exchanger, and stopping the thermal extraction operation of the liquid thermal medium when the temperature of the liquid thermal medium reaches 70° C. or below.

Further, the potential anomaly region is a region where the measured potential value is not equal to zero. The natural potential method is a method to determine the location of the high temperature area of the fire area through detecting the potential anomaly (potential not equal to zero) caused by temperature gradient (thermal potential), intense redox reaction (oxidation reduction potential) of coal, and water vapor migration (flow potential) in the fire area. The potential anomaly region of the coalfield fire area detected in step A is the underground high temperature area which exists in the coalfield fire area at the beginning, that is, the thermal extraction target area; the potential anomaly region continuously existing in the thermal extraction target area detected in step E is a high temperature area of the fire area which continuously exists in the thermal energy extraction process of the gaseous thermal medium, that is, a region where the gaseous thermal medium is difficult to circulate and thermal exchange. Thereby, effective screening of different gas-permeability geological regions in the coalfield fire areas can be realized.

Further, in step C, the injection borehole is arranged on a circumference centered on the extraction borehole having a radius of 10 to 30 m, thereby forming a borehole control region.

Preferably, the gaseous thermal medium is an inert gas.

Preferably, the casing-type borehole thermal exchanger includes a high thermal conductive cylindrical housing vertically disposed in the borehole of the potential anomaly region, and the high thermal conductive cylindrical housing is provided with an inner pipe extending along its central axis and an outer pipe extending along its inner wall, and the inner pipe and the outer pipe are connected at the bottom of the high thermal conductive cylindrical housing; in step F, the liquid thermal medium is injected from the top of the inner pipe by the circulation pump, and is extracted from the top of the outer pipe, and the liquid thermal medium exchanges thermal energy with the high temperature coal rocks through the high thermal conductive cylindrical housing, and the flow rate of the liquid thermal medium is controlled by the circulation pump.

Preferably, the liquid thermal medium is an alkyl naphthalene thermal conducting oil, having good thermal stability, no environmental pollution, and can efficiently transfer heat.

Advantageous effects: the present invention provides a method for extracting thermal energy in an underground high temperature area of a coalfield fire area. Firstly, a thermal extraction target area of the coalfield fire area is determined by a natural potential method and a ground detecting borehole, so that the extraction of thermal energy in the fire area is targeted, and the thermal extraction efficiency is improved. The air inlet and outlet channels connecting the high temperature area of the underground coal fire and the external environment such as surface cracks and collapse pits covering the high temperature area are filled by using the flame-retardant filling body, which can control the development of coal fire in the area and avoid the thermal energy dissipation along the ventilation channels. Then, the extraction borehole and injection borehole of the gaseous thermal medium are constructed, and the injection borehole is arranged on the circumference centered on the extraction borehole to form the borehole control region; and then the nitrogen-type low-temperature inert gas is injected into the underground coal fire high-temperature area as a gaseous thermal medium through the injection borehole, and the gaseous thermal medium exchanges thermal energy with the high-temperature coal rocks in the borehole control region under the pressure difference between the injection borehole and the extraction borehole; and then the gaseous thermal medium is extracted to the earth surface by using the vacuum pump through the extraction borehole, so that the thermal energy extraction of the gaseous thermal medium permeable area in the underground high temperature area of the thermal extraction target area is realized, and the temperature of the area is lowered. During the treatment of coal fires, it also provides a reference for screening areas with high coal rocks compactness and poor gas permeability. While extracting the high-temperature thermal medium, the natural potential of the thermal extraction target area is continuously monitored to determine the potential abnormal area that persistently exists therein, that is, the area where the gaseous thermal medium cannot flow and the air permeability for effective thermal exchange is poor, in the high temperature area. Boreholes are constructed in this area and casing-type borehole thermal exchangers are installed, the thermal exchange between the liquid thermal medium and the high-temperature coal rocks is completed by using the borehole thermal exchanger, thus realizing the efficient extraction of the thermal energy in the high temperature area of the fire area having uneven gas permeability on the basis of effectively screening different geological regions of the coalfield fire area.

The figures include: 1. flame-retardant filling body, 2. overlying rock and soil layer on fire area, 3. injection borehole, 4. extraction borehole, 5. underground high temperature area, 6. potential anomaly region persistently existing in thermal extraction target area (i.e., the area where the gaseous thermal medium is difficult to flow and transfer heat), 7. natural potential test device, 8. gas booster pump, 9. vacuum pump, 10. casing-type borehole thermal exchanger, 11. circulation pump, 12. thermal extraction target area, 13. borehole control region, 14. cooler.

DETAILED DESCRIPTION OF THE EMBODIMENTS

The present invention will be further described below in reference with the drawings and embodiments.

Figure 1:
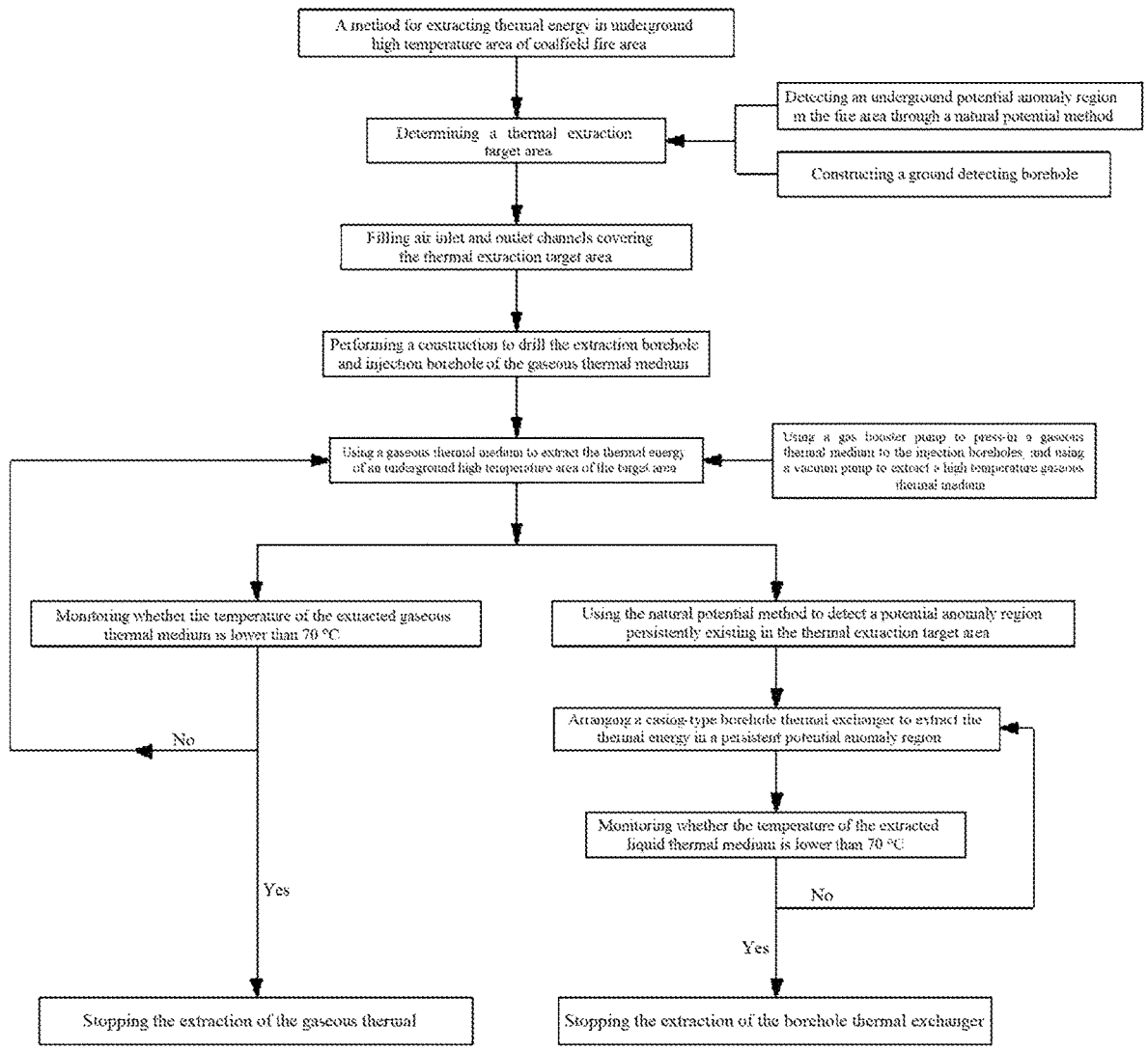
FIG. 1 is a flow chart of a method for extracting thermal energy in an underground high temperature area of a coalfield fire area according to the present invention.

FIG. 1 shows a method for extracting thermal energy in an underground high temperature area of a coalfield fire area, including: a thermal extraction target area 12 is determined by a natural potential method and a ground detecting borehole; and in the thermal extraction target area 12, the injection borehole is used to send a low temperature gaseous thermal medium to the underground high temperature area 5 of the thermal extraction target area 12; after the thermal exchange between the gaseous thermal medium and the high temperature coal rock mass in the fire area, the high temperature gaseous thermal medium is extracted from the earth surface through the extraction borehole 4; the natural potential of the thermal extraction target area 12 is continuously monitored while the high temperature gaseous thermal medium is extracted; a casing-type borehole thermal exchanger 10 is arranged in a potential anomaly region 6 persistently existing in the thermal extraction target area to complete the thermal exchange between the high temperature coal rocks and the liquid thermal medium in this region; when the temperatures of the extracted gaseous thermal medium and liquid thermal medium reach 70° C. or below, the thermal extraction operation is stopped.

Figure 3:
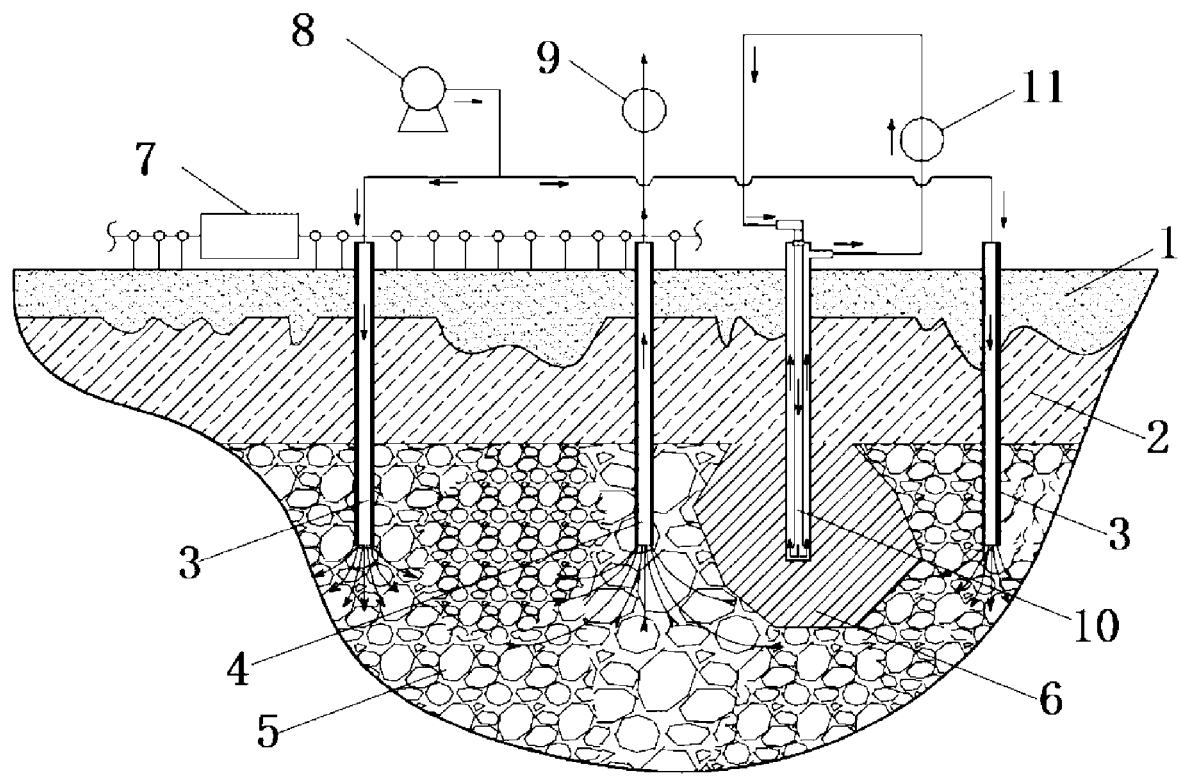
FIG. 3 is a schematic structural diagram of a system for extracting thermal energy in an underground high temperature area of a coalfield fire area according to the present invention (corresponding to the A-A section shown in FIG. 2).

In this embodiment, the following steps are specifically included:

A. the potential anomaly region in the coalfield fire area is detected by using the natural potential test device 7, and the ground detecting borehole is combined to determine the thermal extraction target area 12;

B. the surface cracks, collapse pits and other air inlet and outlet channels covering the thermal extraction target area 12 are filled by using the flame-retardant filling body 1;

C. the construction from the earth surface to the underground high temperature area 5 in the thermal extraction target area 12 is performed to drill the extraction borehole 4 and injection borehole 3 of the gaseous thermal medium successively; the extraction borehole 4 and the injection borehole 3 all pass through the overlying rock and soil layer on fire area 2 to reach the underground high temperature area 5 of the coalfield fire area;

D. as shown in FIG. 3, a gas booster pump 7 installed on the earth surface is used to pressurize the gaseous thermal medium and then introduce it into the injection borehole 3; and subsequently the high temperature gaseous thermal medium which completes thermal exchange with the high temperature coal rock mass is extracted to the earth surface by using a vacuum pump 8 through the extraction borehole 4;

E. a thermometer is used to detect the temperature of the gaseous thermal medium at the exit of the extraction borehole 4, and the thermal extraction operation of the gaseous thermal medium is stopped when the temperature of the gaseous thermal medium reaches 70° C. or below; the natural potential of the thermal extraction target area 12 is continuously monitored while the high temperature gaseous thermal medium is extracted; boreholes are constructed from the earth surface to the underground high temperature area 5 within the potential anomaly region 6 persistently existing in the thermal extraction target area, and the casing-type borehole thermal exchanger 10 is installed; the boreholes pass through the overlying rock and soil layer on fire area 2 to reach the underground high temperature area 5 of the coalfield fire area;

F. the liquid thermal medium is injected into the casing-type borehole thermal exchanger 10 by using the circulation pump 11; the casing-type borehole thermal exchanger 10 is used to complete the thermal exchange between the liquid thermal medium and the high temperature coal rocks; and after completing the thermal exchange with the high temperature coal rocks, the liquid thermal medium is extracted;

G. a thermometer is used to detect the temperature of the liquid thermal medium at the exit of the borehole thermal exchanger 10, and the thermal extraction operation of the liquid thermal medium is stopped when the temperature of the liquid thermal medium reaches 70° C. or below.

Figure 2:
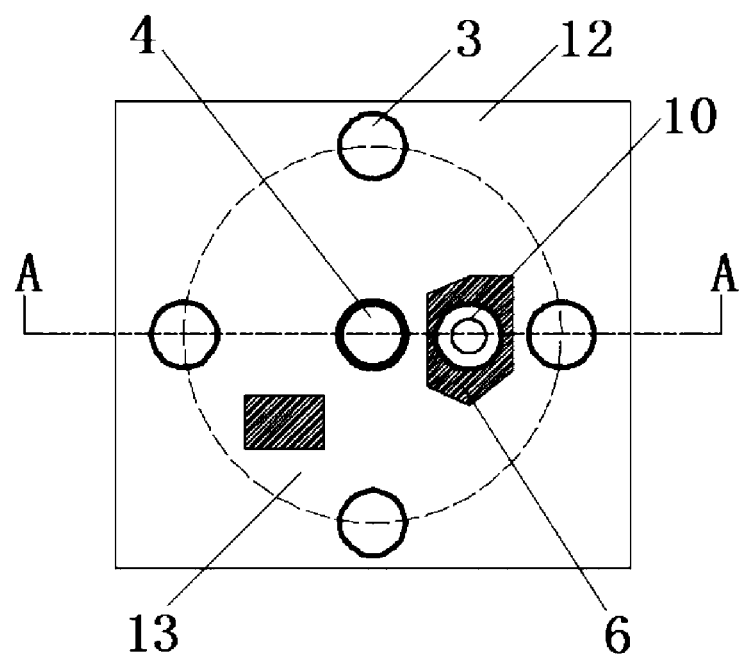
FIG. 2 is a schematic diagram showing a plane arrangement manner of injection borehole and extraction hole of the gaseous thermal medium according to the present invention.

As shown in FIG. 2, in step C, the injection borehole 3 are arranged on a circumference centered on the extraction borehole 4 and having a radius of 20 m, thereby forming the borehole control region 13.

In this embodiment, the gaseous thermal medium is nitrogen gas, and a curing foam is used as the flame-retardant filling body 1, and the liquid thermal medium is an alkyl naphthalene thermal conducting oil.

In the present invention, the potential anomaly region (including the potential anomaly region of the coalfield fire region and the potential anomaly region 6 persistently existing in thermal extraction target area) is a region where the measured potential value is not equal to zero.

In this embodiment, the casing-type borehole thermal exchanger 10 includes a high thermal conductive cylindrical housing vertically disposed in the borehole of the potential anomaly region 6 persistently existing in thermal extraction target area, and the high thermal conductive cylindrical housing is provided with an inner pipe extending along its central axis and an outer pipe extending along its inner wall, and the inner pipe and the outer pipe are connected at the bottom of the high thermal conductive cylindrical housing; in step F, the liquid thermal medium is injected from the top of the inner pipe by the circulation pump 11, and is extracted from the top of the outer pipe, and the liquid thermal medium exchanges thermal energy with the high temperature coal rocks through the high thermal conductive cylindrical housing; the flow rate of the liquid thermal medium is controlled by the circulation pump 11, and the extracted liquid thermal medium is cooled by the cooler 14 and then injected into the casing-type borehole thermal exchanger 10 to complete the circulating thermal collection.

The present invention, on the basis of adopting the gaseous thermal medium to realize the thermal collection in a large-area coalfield fire area, cooperates with the use of the natural potential method to screen the potential anomaly region 6 persistently existing in thermal extraction target area, that is, the area which has high coal rocks compactness and poor gas permeability and the gaseous thermal medium is difficult to enter, and further completes the thermal collection in this area through the casing-type borehole thermal exchanger 10, thereby realizing the efficient extraction of the thermal energy in the high temperature area of the fire area with uneven gas permeability, at the same time, realizing the effective cooling of the fire area, and achieving the purpose of controlling the fire.

The above description is only a preferred embodiment of the present invention, and it should be noted that those skilled in the art can also make several improvements and amendments without departing from the principles of the present invention, and those improvements and amendments should be considered as falling within the protective scope of the present invention.

What is claimed is:

1. A method for extracting thermal energy in an underground high temperature area of a coalfield fire area, wherein the method comprises:

determining a thermal extraction target area by a natural potential method and a ground detecting borehole;

in the thermal extraction target area, using an injection borehole of a plurality of injection boreholes to send a gaseous thermal medium to an underground high temperature area of the thermal extraction target area;

after a first thermal exchange between the gaseous thermal medium and a coal rock mass in a fire area, the gaseous thermal medium is extracted from the earth surface through an extraction borehole;

arranging a casing-type borehole thermal exchanger in an anomaly region persistently existing in the thermal extraction target area to complete a second thermal exchange between the coal rock mass and a liquid thermal medium in the anomaly region; and stopping the thermal extraction when the temperatures of the gaseous thermal medium and the liquid thermal medium reach 70° C. or below.

2. The method for extracting thermal energy in the underground high temperature area of the coalfield fire area according to claim 1, wherein the method further comprises the following steps:

A. detecting the anomaly region in the coalfield fire area through the natural potential method and the ground detecting borehole to determine the thermal extraction target area;

B. filling air inlet and outlet channels covering the thermal extraction target area by using a flame-retardant filling body;

C. drilling the extraction borehole and the injection borehole of the plurality of injection boreholes of the gaseous thermal medium successively from the earth surface to the underground high temperature area in the thermal extraction target area;

D. using a gas booster pump installed on the earth surface to pressurize the gaseous thermal medium and then introducing the thermal medium into the injection borehole of the plurality of injection boreholes; and subsequently extracting the gaseous thermal medium which completes the first thermal exchange with the coal rock mass to the earth surface by using a vacuum pump through the extraction borehole;

E. using a thermometer to detect the temperature of the gaseous thermal medium at an exit of the extraction borehole, and stopping the thermal extraction of the gaseous thermal medium when the temperature of the gaseous thermal medium reaches 70° C. or below; constructing the plurality of injection boreholes from the earth surface to the underground high temperature area within the anomaly region persistently existing in the thermal extraction target area, and installing the casing-type borehole thermal exchanger;

F. injecting the liquid thermal medium into the casing-type borehole thermal exchanger by using a circulation pump; using the casing-type borehole thermal exchanger to complete the second thermal exchange between the liquid thermal medium and the coal rock mass; and after completing the second thermal exchange with the coal rock mass, the liquid thermal medium is extracted;

G. using the thermometer to detect the temperature of the liquid thermal medium at the exit of the casing-type borehole thermal exchanger, and stopping the thermal extraction of the liquid thermal medium when the temperature of the liquid thermal medium reaches 70° C. or below.

3. The method for extracting thermal energy in the underground high temperature area of the coalfield fire area according to claim 2, wherein in step C, the injection borehole of the plurality of injection boreholes is arranged on a circumference centered on the extraction borehole and having a radius of 10 to 30 m, thereby forming a borehole control region.

4. The method for extracting thermal energy in the underground high temperature area of the coalfield fire area according to claim 1, wherein the gaseous thermal medium is an inert gas.

5. The method for extracting thermal energy in the underground high temperature area of the coalfield fire area according to claim 1, wherein the casing-type borehole thermal exchanger comprises a thermal conductive cylindrical housing vertically disposed in a borehole of the anomaly region persistently existing in the thermal extraction target area, and the thermal conductive cylindrical housing is provided with an inner pipe extending along a central axis and an outer pipe extending along an inner wall, and the inner pipe and the outer pipe are connected at a bottom of the high thermal conductive cylindrical housing; in step F, the liquid thermal medium is injected from a top of the inner pipe by a circulation pump, and is extracted from a top of the outer pipe, and the liquid thermal medium exchanges thermal energy with the coal rock mass through the thermal conductive cylindrical housing, and the flow rate of the liquid thermal medium is controlled by the circulation pump.

6. The method for extracting thermal energy in the underground high temperature area of the coalfield fire area according to claim 1, wherein the liquid thermal medium is an alkyl naphthalene thermal conducting oil.

* * * * *